US005734129A

United States Patent [19]

Belville et al.

[11] Patent Number: 5,734,129

[45] Date of Patent: Mar. 31, 1998

[54] FORMS FOR USE WITH HANDWRITING CAPTURING DEVICE

[76] Inventors: Daniel T. Belville, 7556 Wells Ave., Newark, Calif. 94560; Richard Price, P.O. Box 2018, Danville, Calif. 94526-7018

[21] Appl. No.: 311,590

[22] Filed: Sep. 23, 1994

[51] Int. Cl.⁶ .............................. C08C 21/00; B42D 1/00

[52] U.S. Cl. .............................. 178/18; 178/19; 281/2; 281/38

[58] Field of Search .............................. 178/18, 19, 20; 345/173, 174, 176, 179; 382/3, 13, 119, 187, 188, 189; 281/2.38; 283/45, 61, 62

[56] References Cited

U.S. PATENT DOCUMENTS

| | | | |
|---|---|---|---|
| 5,024,374 | 6/1991 | Ashby | 229/71 |
| 5,149,919 | 9/1992 | Greanias | 178/19 |
| 5,223,677 | 6/1993 | Kapp et al. | 178/18 |
| 5,227,590 | 7/1993 | Protheroe et al. | 178/18 |
| 5,322,978 | 6/1994 | Protheroe et al. | 178/18 |
| 5,389,745 | 2/1995 | Sakamoto | 382/13 |
| 5,401,916 | 3/1995 | Crooks | 178/18 |
| 5,412,161 | 5/1995 | Crooks | 178/18 |

OTHER PUBLICATIONS

Satas, Donatas (ed.) "Handbook of Pressure Sensitive Adhesive Technology", 2nd Ed., (Van Nostrand Reinhold, New York), pp. 387–389 and 755–757 (1989).

*Primary Examiner*—Curtis Kuntz
*Assistant Examiner*—Vijay Shankar
*Attorney, Agent, or Firm*—Haverstock & Associates

[57] ABSTRACT

The present invention provides novel methods, forms and devices for simultaneously capturing handwriting on one or more forms and on an electronic device including a membrane digitizer, wherein the forms are integrated with the digitizer.. Proper alignment between the digitizer surface and a business form placed on the digitizer surface is electronically checked. The form is removably affixed to the digitizer by means of an adhesive.

21 Claims, 3 Drawing Sheets

FORMS FOR USE WITH HANDWRITING CAPTURING DEVICE

FIELD OF THE INVENTION

The present invention relates to business forms, methods and devices for capturing handwriting simultaneously on a business form and in electronic medium. More particularly, the present invention relates to custom business forms which are used in conjunction with a membrane digitizer handwriting capturing device for subsequent processing of the electronic data by a conventional computer.

BACKGROUND OF THE INVENTION

Data are conventionally recorded and processed through the use of paper, computer technology or a combination of paper and computer technology. Data on paper are generally easy to read, file and share. Data stored in a computer are usually easy to retrieve and more conveniently processed than data stored on paper. Commonly, these two main data recording systems are combined by, for example, entering data stored on paper into a computer or by retrieving data from a computer through a printout. Data can be entered simultaneously as a paper record and a computer record. For example, U.S. Pat. No. 5,227,590 (Protheroe et al., 1993), discloses a device wherein handwriting executed on paper affixed to a membrane digitizer simultaneously captures a handwritten record on paper and in a computer.

Many types of information are most effectively entered on a form delineating specific spaces for specific types of entries. Usage of standard forms facilitates both data entry and data usage. A specific space for data entry may be allocated on a paper business form or in a computer wherein it is generally referred to as a field. A membrane digitizer can be divided into data fields for entry of different types of data which can be stored as data files for simultaneous or subsequent data processing in different computer data fields. A business form may be combined with a digitizer by positioning the form on the digitizer wherein the spaces on the form are aligned with the corresponding data fields on the digitizer. Thus, a handwritten entry made on a paper form can result in simultaneously making a digitizer entry in the required field.

It is known in the art that the combination of a business form and a digitizer results in two problems, see, for example, U.S. Pat. No. 5,322,978 (Protheroe et al., 1994), herein incorporated by reference. Firstly, the operator needs to be careful in aligning the form with the digitizer in order to align the spaces on the business form with the corresponding fields in the digitizer. As a result, placement of the form is a time-consuming task. Secondly, if misorientation of the form occurs it can result in a digitizer record wherein the data are not recorded in the proper field. Protheroe et al. '978 have attempted to solve the alignment problem by incorporating a printer in the digitizing device. The printer feeds a printed form to a predetermined position over the digitizer membrane. However, it is well known that incorporation of a printer into an electronic device such as a digitizer results in undesirable increased weight, increased size, increased power consumption and reduced reliability since printers rely on moving mechanical components.

Accordingly, the need exists for a business form and a membrane digitizer device for simultaneously recording handwritten information on a form and on a digitizer wherein the form is reliably and easily aligned with the digitizer surface.

SUMMARY OF THE INVENTION

The present invention provides a novel device for simultaneously capturing handwriting on at least one business form and an electronic apparatus.

In one embodiment, the instant invention provides novel business forms for capturing handwriting wherein the spaces on the form for recording handwriting are aligned with data fields in a membrane digitizer surface.

In another embodiment, the form is aligned with the digitizer surface by means of alignment sensors in the digitizer surface and characters or icons on the form.

In yet another embodiment, the form is affixed to the digitizer by means of an adhesive.

In another embodiment, the handwriting data is downloaded from the digitizer to a conventional computer for data storage and processing.

In still another embodiment, the handwriting is simultaneously captured on two forms and an electronic apparatus.

In an additional embodiment of the instant invention, a novel method is provided for simultaneously capturing handwriting on one or two business forms and an electronic apparatus.

DETAILED DESCRIPTION OF THE INVENTION

While describing the invention and its embodiments, certain terminology will be utilized for the sake of clarity. It is intended that such terminology include not only recited embodiments, but all technical equivalents which perform substantially the same function, in substantially the same manner to achieve substantially the same result.

Figure 1:
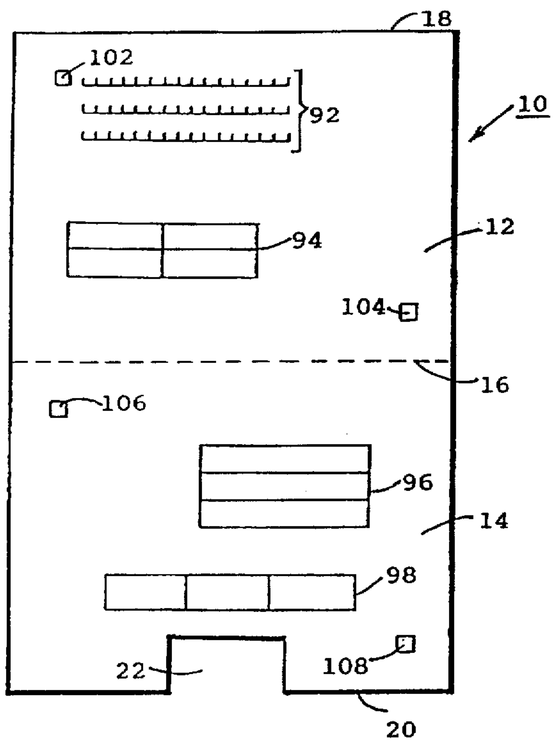
FIG. 1 is a plan view of a business form of the present invention.

Referring to FIG. 1, a first business form 10 of the present invention, includes a top half 12 and a bottom half 14. A weakened line 16 across the width of form 10 separates top half 12 from bottom half 14. Line 16 is substantially equidistant between top edge 18 and bottom edge 20. Line 16 is weakened, for example, by perforating or partly cutting into the form along line 16. Weakened line 16 facilitates folding top half 12 onto bottom half 14 wherein top edge 18 is substantially contiguous with bottom edge 20. The printed surface of form 10 is on the outside when form 10 is folded along line 16. Bottom half 14 has a section defining an opening in close proximity to bottom edge 20, such as, for example, a notch 22 along bottom edge 20.

Figure 2:
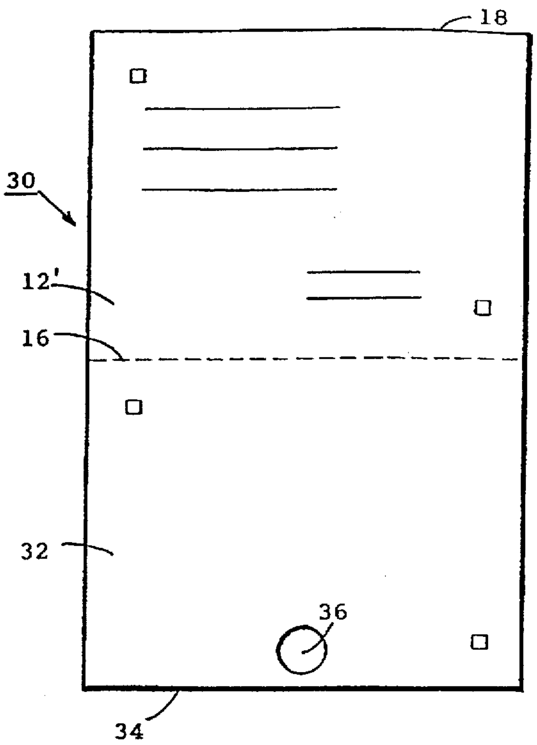
FIG. 2 is a plan view of an alternate business form.

FIG. 2 illustrates an alternate embodiment of a first business form wherein form 30 has a bottom half 32 with a bottom edge 34. Bottom half 32 has a section defining an opening which is a hole 36 in close proximity to bottom edge 34. Form 30 also includes a top edge 26, a top half 24, a weakened line 28, alignment areas 42, 44, 46, 48, and information blocks 38, 40. Alternately, first business forms of the present invention may provide sections defining more than one opening in close proximity to the bottom edge of the form.

The handwritten data can be simultaneously recorded on the first business form and a second business form. This is achieved by positioning the second business form inside the pocket which is formed by folding the first form along the weakened line. Conventional carbonless imaging can be used between the first and second form. For example, the back of the first form 10 can be coated with a self-imaging material as described in U.S. Pat. No. 5,024,374 (Ashby, 1991), herein incorporated by reference. Alternately, the back surface of the first form may be provided with a CB coating while the front surface of the second form has a CF coating, such as, for example, disclosed in Ashby '374.

A membrane digitizer device used in conjunction with the business forms of the present invention includes a handwriting capturing device using a housing containing a conventional pressure sensitive digitizer surface, conventional electronic processing circuitry and hardware for controlling the information flow and storing the data in digital form. A port is provided to dump the data to an external computer for non-volatile data storage and data processing.

Figure 3:
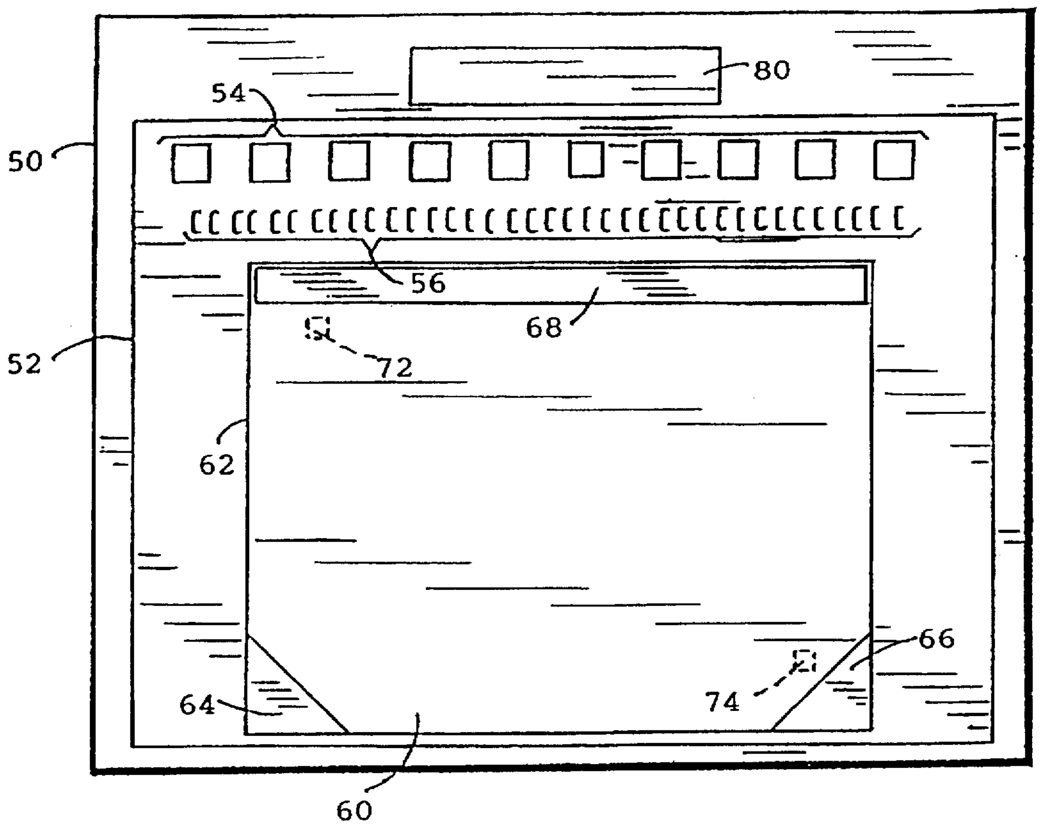
FIG. 3 is a plan view of the top surface of a digitizer of the present invention.

FIG. 3 depicts a top surface 50 of a membrane digitizer device according to the instant invention. A pressure-sensitive digitizer surface 52 is mounted on surface 50. Icons 54 are provided on surface 52 itself or provided on a flexible material which is adhesively attached to pressure-sensitive surface 52. Exerting pressure on a given icon causes the digitizer to select and operate the electronic processing function represented by the icon. Similarly, alphanumeric symbols 56 may be provided to the pressure-sensitive surface 52 by means of a flexible strip. This enables the operator of the device to enter letters and numbers by means of the alphanumeric symbols 56 or by handwriting the alphanumeric symbols.

Pressure-sensitive surface 52 includes an area 60 marked by boundary 62 wherein boundary 62 substantially corresponds to the size and shape of a first form which is folded along the weakened line. The boundary can be marked by lines provided on surface 52 or by a frame wherein the opening corresponds to the size and shape of the first form. The boundary adjacent to the icons forms the top boundary of area 60. The position of the bottom boundary of area 60 is opposite of the top boundary. The corners 64 and 66 of the bottom boundary are designed to assist in holding the folded form in an aligned position on surface 50. Corners 64 and 66 can consist of an overlay of rigid material forming a pocket between the overlay and surface 52 such that the corners of the folded first form are positioned snugly into these pockets. In the preferred embodiment, the folded form covers all of the pressure-sensitive surface 52 except where the flexible strip is positioned.

A glue strip 68 is attached to area 60 inside and adjacent to the top boundary along the entire width of the top boundary, see FIG. 3. The glue strip 68 exposes a pressure-sensitive adhesive surface capable of removably affixing a business form to area 60. It is believed that suitable adhesives for the present invention include pressure-sensitive adhesives which are used in removable labels. These adhesives are commonly based on natural or synthetic rubber as shown in the examples provided in D. Satas (ed.) *Handbook of Pressure Sensitive Adhesive Technology*, 2nd Ed., (Van Nostrand Reinhold, New York), pp. 387–389 and 755–757 (1989). The position of glue strip 68 approximately matches the opening 22 of the folded first form when the weakened line is aligned with the bottom boundary of area 60. The glue strip 68 extends outside area 60 when digitizer icons are provided on a flexible strip to adhesively attach the folded form as well as the flexible strip.

Two alignment positions 72 and 74 of surface 52 within area 60 are programmed to check for correct alignment of the first form on boundary 62. Typically, positions 72 and 74 are in two opposite corners of area 60.

Optionally, top surface 50 of the digitizer device has a conventional liquid crystal display (LCD) 80.

Figure 5:
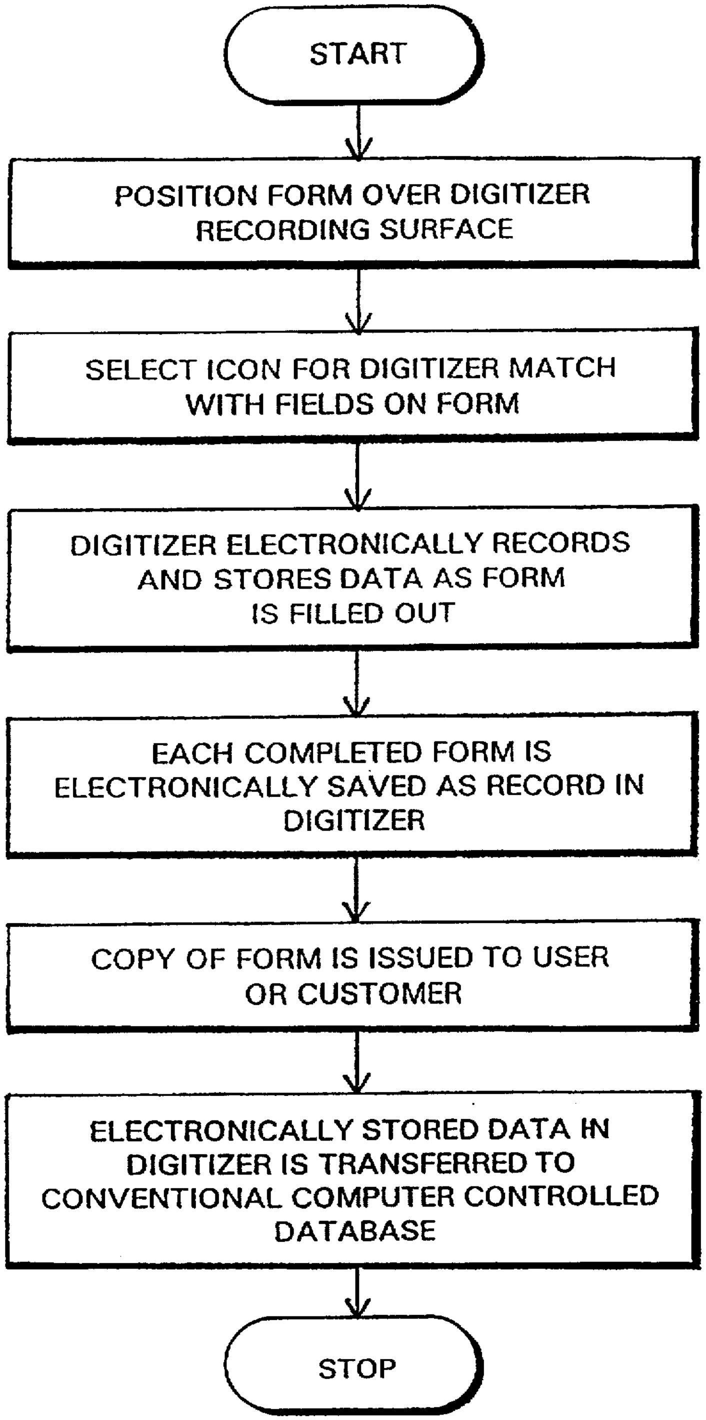
FIG. 5 is a flow diagram illustrating the method of the present invention for simultaneously capturing handwriting on a business form and an electronic apparatus.

An application program means provides the operational link between the business forms, the digitizer and the external computer for the method of simultaneous capturing handwriting on a business form and on electronic apparatus which is illustrated in FIG. 5. The program is designed to create customized business forms and customized digitizer functionality suitable for many applications, such as, for example: fire inspections, construction or building inspections, receipts of goods or services, patient medical information particularly in emergency treatment or field hospitals, observations during military exercises, record-keeping during sporting events such as athletic competitions and collecting manufacturing process data.

Upon selection of a programmed application of the business forms and device of the present invention, custom forms can be printed by a computer controlled printer utilizing software designed for the particular application. The software causes the printer to print the appropriate business form providing specific spaces on the form for the handwritten information which needs to be recorded. However, the invention is fully operable with forms which are prepared in any manner provided the specific spaces or information on the form matches the appropriate locations of the digitizer information fields. FIG. 1 shows a custom printed business form 10 wherein spaces are provided in blocks 92, 94, 96 and 98 of this form.

For example, form 10 can be used to record the results of a building fire safety inspection. Spaces within block 92 can be used to record the site location, while area 94 can be used to record inspection results for specific types of equipment such as a sprinkler, a fire alarm, a standpipe and a key box. Spaces within block 96 can be used to record fire safety violations while the inspection date and the name and signature of the inspector can be recorded within the spaces of block 98.

Form 10 is used in the following manner to conduct a fire inspection. Form 10 (FIG. 1) is folded along line 16 in which the printed information is on the outside of the pocket which is formed. Folded form 10 with top half 12 facing up is affixed to the digitizer top surface 50 by placing the form inside and aligned with boundary 62 wherein top edge 18 is placed in alignment with the top boundary of pressure-sensitive surface 52. The corners of the folded form along line 16 are placed under corners 64 and 66. Form 10 is then pressed against glue strip 68, resulting in an adhesive bond between top half 12 and glue strip 68 through opening 22 provided in bottom half 14.

Icon 54, representing the fire safety inspection is pressed. This causes the digitizer to select information fields which substantially match the respective spaces on the fire inspection business form. The operator then presses the space marked page 1 on top half 12 of form 10, thereby causing the digitizer to select the digitizer program for the top half of the fire inspection form. Next, the operator presses areas 102 and 104 on the form, thus pressing alignment positions 72 and 74 of pressure sensitive surface 52. Pressing on positions 102 and 104 causes the digitizer to check for alignment between the form and the digitizer surface. The digitizer is programmed to align its information fields with the form upon pressing form areas 102 and 104.

The operator writes the inspection information in the appropriate spaces of form 10, using a writing implement such as a ballpoint pen or a pencil and exerting sufficient pressure during writing to cause the digitizer to capture the writing signal. Using conventional software and hardware the writing signal is stored in a data file for future downloading to an external computer. Each type of data file thus created is specific for each application.

Once the information on the top half 12 of form 10 is completed, the form is removed from the pressure-sensitive surface. The folded form is then turned over, and affixed to pressure-sensitive surface 50 with the printed side of the bottom half 14 of folded form 10 facing the user. Line 16 is aligned with the top boundary. The corners of the folded form along bottom edge 20 are placed under corners 64 and 66, once the form has been placed inside and aligned with boundary 62. Form 10 is pressed against glue strip 68. The space marked page 2 on bottom half 14 is then pressed to select the fire inspection program for the bottom half of form 10. Form areas 106 and 108 are pressed to correct for possible misalignment in the placing of the form on the digitizer. The operator then writes the information in the appropriate spaces of the bottom half of the form, thus completing the inspection report.

Figure 4:
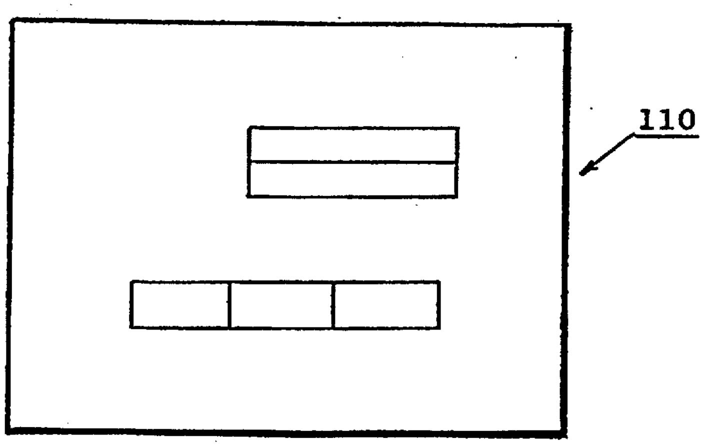
FIG. 4 is a plan view of an additional business form.

Alternately, a second form can be used simultaneously with the folded form 10. An example of a second form 110 is illustrated in FIG. 4. The size of form 110 is the same as the bottom half 14 of form 10. The information spaces 76, 78 on form 110 match those on the bottom half 14 of form 10, although form 110 may have fewer information spaces than form 10. Form 110 is placed inside the pocket formed by form 10 when form 10 is folded along line 16. A carbonless imaging coating applied on the back surface of bottom half 14 or on the front surface of form 110 causes the handwriting on form 10 to be copied on form 110, while the digitizer records the handwritten information. It is advantageous to simultaneously create two forms if the forms are intended for two different purposes. For example, if the first and second form are used in a fire safety inspection, the first form can include all of the inspection results while the second form can be limited to fire safety violations only. The second form can then be issued immediately to the owner of the premises.

The information is transferred from the digitizer to an external computer for storage and data processing. For example, if a fire safety violation is recorded on form 10 and on the digitizer, the re-inspection form which is printed through the computer controlled printer can incorporate the information which was recorded during the original inspection.

Optionally, the business forms may contain a bar code (not shown) which can be printed on the form or a bar coded label can be applied to the form by the operator. The bar code can be used to verify authenticity of the form, verify the identity of the operator or for other information gathering purposes.

Different types of paper are suitable for forms of the present invention. These include cellulose-based papers and non-cellulose papers, such as, for example, polypropylene. The non-cellulose forms are particularly useful when the handwriting capturing device is used under wet conditions such as may occur for outdoor use of the forms.

The invention has been described in terms of the preferred embodiment. One skilled in the art will recognize that it would be possible to construct the elements of the present invention from a variety of means and to modify the placement of components in a variety of ways. While the preferred embodiments have been described in detail and shown in the accompanying drawings, it will be evident that various further modifications are possible without departing from the scope of the invention as set forth in the following claims. For example, printable forms other than business forms are within the scope of the present invention. Additionally, pages having multiple folding lines can also be used to provide more writing surfaces. For example, a page with two folds can provide three sheets onto which information can be written.

I claim:

1. A handwriting capturing device for simultaneously capturing handwriting on at least one business form and an electronic apparatus wherein the handwriting capturing device comprises:

a digitizer having a digitizer surface for capturing handwriting executed within data fields in the digitizer surface and storing captured handwriting as an electronic data file;

a first business form of printable material having a front surface, a back surface, a top edge and a bottom edge opposite the top edge, additionally having a weakened line across the first business form substantially equidistant between the top edge and the bottom edge, wherein a top half of the first business form is created by an area extending from the top edge to the weakened line and a bottom half is formed by an area extending from the bottom edge to the weakened line in which the bottom half has a section defining in opening in close proximity to the bottom edge, wherein the first business form has printed thereon spaces for handwriting entry in which the spaces are aligned with the data fields when the first business form is placed on the digitizer surface in an aligned position;

a computer for receiving, storing and processing the electronic data file and for causing a printing device to print the first business form; and a connecting means to connect the digitizer to the computer.

2. The device of claim 1 wherein the opening comprises a notch in the bottom edge of the first business form.

3. The device of claim 1 wherein the weakened line comprises a perforated line.

4. The device of claim 1 wherein the printable material is selected from the group consisting of cellulose based paper and non-cellulose paper.

5. The device of claim 1 wherein the first business form is provided with a bar code.

6. The device of claim 1 additionally comprising a second business form of printable material having a front surface, a back surface, a top edge and a bottom edge opposite the top edge and wherein the second business form substantially conforms in size to the bottom half of the first business form, in which the second business form has entries printed on the from surface which substantially correspond in size, shape and location to the entries on the front surface of the bottom half when the top edge of the second business form is aligned with the weakened line of the first business form, wherein a carbonless imaging means is provided between the front surface of the second business form and the back surface of the bottom half of the first business form.

7. The device of claim 6 wherein the carbonless imaging means comprises a CB coating on the back of the first business form and a CF coating on the front of the second business form.

8. The device of claim 1 additionally comprising an application program means for the digitizer and the computer.

9. The device of claim 1 wherein the digitizer comprises:

a housing having a top surface including the digitizer surface wherein the digitizer surface is sensitive to handwriting executed with an ordinary writing instrument;

one or more symbols provided on the digitizer surface wherein the symbol enables an operator to select a specific digitizer function by pressing the appropriate symbol;

at least two alignment positions provided on the digitizer surface;

a first digitizer circuit means coupled to the digitizer surface for sensing pressure on the symbol and creating a first digitizer response, wherein the data fields are created in the digitizer surface;

a second digitizer circuit means coupled to the digitizer surface for sensing pressure on the alignment locations and creating a second digitizer response, indicating whether pressure was exerted inside or outside the alignment positions;

a third digitizer circuit means coupled to the digitizer surface for sensing handwriting on the digitizer surface whereby an electronic data file is obtained and stored within the digitizer;

a fourth digitizer circuit means for downloading the electronic data file to the computer;

a port in the housing comprising the connecting means between the digitizer and the computer;

a fastening means to fasten the first business form onto the digitizer; and a boundary marked on the digitizer surface having a top boundary edge and a bottom boundary edge which is opposite the top boundary edge wherein the boundary substantially conforms to the size and shape of the top half of the first business form.

10. The device of claim 9 wherein the digitizer surface comprises a pressure-sensitive digitizer membrane.

11. The device of claim 9 wherein one or more symbols is selected from the group consisting of computer icons and alphanumeric symbols.

12. The device of claim 9 wherein the fastening means comprises a glue strip exposing a pressure- sensitive adhesive inside the boundary and adjacent to the top boundary edge.

13. The device of claim 9 wherein the digitizer additionally comprises a conventional liquid crystal display to display the data.

14. The device of claim 9 wherein the writing instrument is selected from the group consisting of pens and pencils.

15. The device of claim 9 wherein the first business form additionally comprises:

at least two alignment marks printed on the front surface of the top half substantially corresponding in size, shape and location with the alignment positions on the digitizer surface when the top half is placed on the digitizer surface wherein the a top edge of the first business form is aligned with the top boundary edge; and at least two alignment marks printed on the front surface of the bottom half substantially corresponding in size, shape and location with the alignment positions on the digitizer surface when the bottom half is placed on the digitizer surface wherein the weakened line is aligned with the top boundary edge.

16. A method for simultaneously capturing handwriting on at least one business form and on an electronic apparatus comprising the steps:

programming a digitizer having a digitizer surface to receive and process handwriting in specific data fields within a boundary provided on the digitizer surface wherein the boundary has a top edge;

programming the digitizer to provide at least two alignment positions on the digitizer surface which enable the digitizer to check for proper alignment of the first business form when placed on the digitizer surface;

applying a pressure sensitive adhesive to the boundary in close proximity to the boundary top edge;

creating a first business form of printable material having a front surface, a back surface, a top edge and a bottom edge opposite the top edge, additionally having a weakened line across the first business form substantially equidistant between the top edge and the bottom edge, wherein a top half of the first business form is formed by an area extending from the top edge to the weakened line and a bottom half is formed by an area extending from the bottom edge to the weakened line in which the top half of the first business form substantially matches the boundary provided on the digitizer surface;

removing a section of the bottom half defining an opening wherein the opening is in close proximity to the bottom edge;

printing entries on the front surface of the top half in which the entries provide designated spaces for handwritten data entry wherein the designated spaces substantially correspond in size, shape and location with the data fields of the digitizer when the top half is placed on the digitizer surface with the entries facing up wherein the top edge of the first business form is aligned with the boundary top edge;

printing at least two alignment marks on the front surface of the top half substantially corresponding in size, shape and location with the alignment positions on the digitizer surface when the top half is placed on the boundary wherein the top edge of the first business form is aligned with the boundary top edge;

printing entries on the front surface of the bottom half wherein the entries provide designated spaces for handwritten data entry wherein the designated spaces substantially correspond in size, shape and location with the data fields of the digitizer when the bottom half is placed on the digitizer surface with the entries facing up wherein the weakened line is aligned with the boundary top edge;

printing at least two alignment marks on the front surface of the bottom half substantially corresponding in size, shape and location with the alignment positions on the digitizer surface when the bottom half is placed on the digitizer surface wherein the weakened line is aligned with the boundary top edge;

folding the top half onto the bottom half along the weakened line forming a folded business form with the printed entries on the outside;

placing the folded business form on the digitizer surface with the printed entries of the top half facing up and closely matching the boundary with the folded business form wherein the top edge of the folded business form is aligned with the boundary top edge;

pressing the top edge of the folded business form onto the pressure sensitive adhesive to affix the folded business form to the digitizer;

activating the digitizer function corresponding to the entries printed on the top half of the folded business form;

handwriting information in the designated spaces on the top half;

removing the folded business form from the digitizer;

placing the folded business form on the digitizer surface with the printed entries of the bottom half facing up and closely matching the boundary with the folded business form wherein the weakened line of the folded business form is aligned with the boundary top edge;

pressing the top edge of the folded business form onto the pressure-sensitive adhesive;

activating the digitizer function corresponding to the entries printed on the bottom half of the folded business form;

handwriting information in the designated spaces on the bottom half;

removing the folded business form from the digitizer; and downloading the digitizer to a computer.

17. The method of claim 16 wherein the opening in the bottom half comprises a notch along the bottom edge.

18. The method of claim 16 additionally comprising a second business form of printable material having a front surface, a back surface, a top edge and a bottom edge opposite the top edge and substantially conforming in size to the bottom half of the first business form, in which the second business form has entries printed on the front surface which substantially correspond in size, shape and location to the entries on the front surface of the bottom half when the top edge of the second business form is aligned with the weakened line of the first business form, wherein a carbonless imaging means is provided between the front surface of the second business form and the back surface of the bottom half of the first business form.

19. The method of claim 16 wherein the carbonless imaging means comprises a CB coating on the back of the first business form and a CF coating on the front of the second business form.

20. A paper form for use with a membrane digitizer for simultaneously capturing information on paper as handwriting and also for storing captured handwriting as an electronic data file, the paper form comprising:

a sheet of printable material having a front surface, a back surface, a top edge and a bottom edge opposite the top edge, additionally having a weakened line across the paper form between the top edge and the bottom edge, wherein a top sub-sheet of the paper form is created by an area extending from the top edge to the weakened line and a bottom sub-sheet is formed by an area extending from the bottom edge to the weakened line;

an opening through the bottom sub-sheet in close proximity to the bottom edge for providing access through which the top sub-sheet can be secured to the membrane digitizer by an adhesive on the membrane digitizer; and spaces for handwriting entries appropriately aligned to the membrane digitizer wherein the spaces correspond with the membrane digitizer to allow the membrane digitizer to capture the handwriting entries within the spaces.

21. The paper form of claim 20 wherein the weakened line comprises a perforated line.

* * * * *

UNITED STATES PATENT AND TRADEMARK OFFICE

CERTIFICATE OF CORRECTION

PATENT NO. : 5,734,129

DATED : March 31, 1998

INVENTOR(S) : Belville et al.

It is certified that error appears in the above-identified patent and that said Letters Patent is hereby corrected as shown below:

On the title page: Item [56]

IN THE REFERENCES CITED:

Delete "Greanias" and insert --Greanias et al.--.

In reference to patent number 5,412,161, delete "Crooks" and insert --Crooks et al.--.

UNITED STATES PATENT AND TRADEMARK OFFICE

CERTIFICATE OF CORRECTION

PATENT NO. : 5,734,129

DATED : March 31, 1998

INVENTOR(S) : Belville et al

It is certified that error appears in the above-identified patent and that said Letters Patent is hereby corrected as shown below:

Column 3, line 29, delete "symbols 56" and insert --symbols 50--.

IN THE CLAIMS

Column 6, line 54, delete "from surface" and insert --front surface--.

IN THE ABSTRACT

Delete "digitizer.. Proper" and insert --digitizer. Proper--.

Delete "digitizer by means of an adhesive" and insert --digitizer by an adhesive--.

Signed and Sealed this

Twenty-third Day of June, 1998

Attest:

BRUCE LEHMAN

Attesting Officer

*Commissioner of Patents and Trademarks*